United States Patent [19]

Wiewiorowski et al.

[11] 4,384,889

[45] May 24, 1983

[54] SIMULTANEOUS LEACHING AND CEMENTATION OF PRECIOUS METALS

[75] Inventors: Tadeusz K. Wiewiorowski; Phillip D. Mollère, both of New Orleans, La.

[73] Assignee: Freeport Research & Development Company, New York, N.Y.

[21] Appl. No.: 254,534

[22] Filed: Apr. 15, 1981

[51] Int. Cl.³ ............................................. C22B 3/00
[52] U.S. Cl. .............................. 75/101 R; 75/106; 75/109; 75/118 R; 75/121
[58] Field of Search ............... 423/27, 29, 22; 75/105, 75/106, 118, 109, 121, 101 R

[56] References Cited

U.S. PATENT DOCUMENTS

| | | | |
|---|---|---|---|
| 418,137 | 12/1889 | MacArthur | 75/105 |
| 512,046 | 1/1894 | Moldenhauer | 75/107 |
| 513,174 | 1/1894 | Carter et al. | 75/107 |
| 515,148 | 2/1894 | Janin | 75/105 |
| 522,739 | 7/1894 | Moldenhauer | 75/107 |
| 532,238 | 1/1895 | Moldenhauer | 75/107 |
| 578,341 | 3/1897 | Koneman | 75/107 |
| 629,905 | 8/1899 | Hood | 75/109 |
| 630,982 | 8/1899 | Betty | 75/105 |
| 682,612 | 9/1901 | Godbe | 75/105 |
| 701,002 | 5/1902 | De Alzugaray | 75/105 |
| 805,017 | 11/1905 | Joseph | 75/105 |
| 868,551 | 10/1907 | Hall | 75/105 |
| 1,002,446 | 9/1911 | Porter | 75/107 |
| 1,090,661 | 3/1914 | Urquhart | 75/109 |
| 1,092,765 | 4/1914 | Butters | 75/107 |
| 1,156,383 | 10/1915 | Towne et al. | 75/109 |
| 1,160,849 | 11/1915 | Conklin | 75/109 |
| 1,236,501 | 8/1917 | Tippett | 75/105 |
| 1,311,919 | 8/1919 | Seale et al. | 209/166 |
| 1,323,588 | 12/1919 | Gordon | 75/118 |
| 1,361,459 | 12/1920 | Hansen | 75/105 |
| 1,578,618 | 3/1926 | Welch | 75/105 |
| 2,042,121 | 6/1936 | Parker | 75/109 |
| 2,100,865 | 11/1937 | Mills et al. | 75/109 |
| 3,371,779 | 3/1968 | Hollingsworth et al. | 209/166 |
| 3,446,353 | 5/1969 | Davis | 209/164 |
| 3,764,650 | 10/1973 | Scheiner et al. | 75/118 R |
| 3,846,124 | 11/1974 | Guay | 75/118 R |
| 3,902,896 | 9/1975 | Borbely et al. | 75/109 |
| 3,988,415 | 10/1976 | Barr | 423/22 |
| 4,082,546 | 4/1978 | Wallace | 75/109 |
| 4,092,154 | 5/1978 | Dietz, Jr. et al. | 75/109 |
| 4,177,068 | 12/1979 | Balarishnan | 75/105 |

OTHER PUBLICATIONS

Habashi, *Extractive Metallurgy*, vol. 2, Gordon & Breach, N.Y., (1970), pp. 24–39, 227, 228.

*Primary Examiner*—Brian E. Hearn
*Attorney, Agent, or Firm*—Raúl V. Fonte

[57] ABSTRACT

A method for the recovery of precious metals such as gold and silver from various ore types is disclosed which involves subjecting a slurry of the ore to a simultaneous leaching and cementation process with a reagent such as an alkaline cyanide solution providing for the leaching requirement and a reducing metal affording cementation. The reducing metal is selected from the group consisting of cadmium, copper, iron, lead, molybdenum, tin, zinc and alloys and mixtures comprising at least two of these metals. The simultaneous leaching and cementation occur under conditions controlled to afford at least partial dissolution of the precious metal values from the ore, whereby continuous transfer of these values from the ore onto the surface of the reducing metal is promoted. The resultant cementation product, i.e., the reducing metal with precious metal values cemented thereon, is separated from the ore slurry and subjected to a subsequent precious metal recovery step by conventional methods.

28 Claims, 1 Drawing Figure

SIMULTANEOUS LEACHING AND CEMENTATION OF PRECIOUS METALS

BACKGROUND OF THE INVENTION

1. Field of the Invention

This invention relates to a process for the recovery of precious metals such as gold and silver from carbonaceous ores and mixtures of carbonaceous and oxide ores containing such metals by leaching and cementation techniques.

2. Prior Art

The present practices in the field of recovery of precious metals such as gold and silver from ores often require segregation of such ores prior to their processing, of which ores there are two basic types: first, oxide ores from which the precious metal values are easily extracted by present cyanidation techniques, and, second, carbonaceous ores which are refractory to conventional cyanidation techniques and which are characterized by their organic carbon content, which is normally between 0.25 and 3% by weight. To render the latter more amenable to cyanide extraction a single-or multi-stage pretreatment prior to cyanidation is normally required to prevent the carbonaceous component of the ore from adsorbing the gold- or silver- cyanide complex formed during leaching. This pretreatment alone can consume up to approximately thirty hours of processing time and necessitates costly plant equipment and operating expenditures.

Various patents have separately addressed the leaching and cementing aspects of processing ores bearing precious metals to effect improved recoveries. U.S. Pat. No. 805,017, for example, discloses the synergistic effect of leaching ores with solutions of sodium cyanide and ammonium carbonate, along with other ammonium additives such as ammonium nitrate, and compressed air. The chemistry which this particular system of leaching affords reportedly involves complete dissolution of the precious metal values present in the ore via complexation with the cyanogen formed in solution. Carbon dioxide produced in such system, resulting from the addition of the ammonium carbonate, protects the cyanogen from destruction by ammonia, and the ammonium ions present in solution are said to provide better extractions. After the extraction process is performed phase disengagement is carried out to obtain a metal-bearing solution from which the precious metal values may be recovered by any suitable means.

A process for the extraction of gold and silver from their ores employing an alkaline cyanide compound as the leaching agent wherein the precious metal values are extracted from the ore followed by filtration of the leaching slurry to obtain a solution which will afford recovery of the dissolved metal values via cementation is taught in U.S. Pat. No. 4,177,068. The concept of simultaneous leaching and cementation is not disclosed in this patent.

U.S. Pat. Nos. 512,046 and 513,174 discloses methods wherein cyanide solutions containing precious metal values can be subjected to cementation with aluminum and zinc, respectively. Both patents require the use of filtered solutions for cementation and fail to teach a simultaneous leaching and cementation process. The same may be said of U.S. Pat. No. 418,137 which claims cyanide leaching of neutralized ores to cause the dissolution of the metal values present in the ore followed by solid-liquid separation and passage of the metal-bearing solution obtained through a zinc sponge for cementation.

U.S. Pat. No. 1,002,446 describes a method of recovering precious metals from their ores wherein a finely divided ore is suspended in a cyanide solution, which solution has effected the dissolution of the metal values present in the ore, with the introduction of aluminum plates directly into the ore pulp to afford cementation. This patent calls for completeness in dissolution of the precious metals contained in the ore.

BROAD DESCRIPTION OF THE INVENTION

In view of the above prior art and conventional methods of processing ores containing precious metal values, it is an object of this invention to provide an improved process for the recovery of precious metals from their ores. Another object of this invention is to provide a process for the simultaneous leaching and cementation of precious metals such as gold and silver. Another object is to provide an improved method for the recovery of precious metals from refractory carbonaceous ores. A further object of this invention is to provide a process for the recovery of precious metals from their ores which does not require a pretreatment stage for aggressive oxidation, such as roasting, chlorination or the like. A still further object is to provide a process for the recovery of precious metals from mixed carbonaceous-oxide ores which does not require the segregation of these two types of ores. An important object of this invention is to provide a process for the recovery of precious metals from their ores which does not suffer from the disadvantages of prior processes and which at the same time provides improved recoveries. Other objects and advantages are set out herein or are obvious herefrom to one ordinarily skilled in the art.

The objects and advantages set forth above are achieved by the process of this invention.

The invention provides a process for the recovery of precious metals such as gold and silver from various types of ores including carbonaceous or refractory ores and mixtures of carbonaceous and oxide ores. The process comprises subjecting an aqueous slurry of ground ore to simultaneous leaching and cementation at an elevated temperature by adding a precious metal-complexing agent to the slurry and contacting said slurry with a reducing metal. The precious metal-complexing agent and the reducing metal may be added to the slurry simultaneously or consecutively. An alkaline material is also added in an amount sufficient to maintain the liquid phase of the slurry at a pH higher than 9. The reducing metal is selected from the group consisting of cadmium, copper, iron, lead, molybdenum, tin, zinc and alloys and mixtures comprising at least two of these metals. The process thereby achieves simultaneous leaching and cementation by facilitating the simultaneous transfer of the precious metal from the ore to the liquid phase (leaching) and from the liquid phase to the reducing metal (cementation).

We have found that the combination of a leaching process with a cementation process in a sequential fashion does not afford improvements in precious metal recoveries of the same magnitude that this invention achieves, particularly when processing carbonaceous ores.

The slurry-metal contact occurs under controlled conditions, which in turn afford the process of simultaneous leaching and cementation, wherein the precious metal values undergo continual transfer from the ore to the surface of the reducing metal. It is a uniquely advantageous feature of this invention that the process conditions only require the precious metal concentrations of the liquid phase of the slurry to remain, at any point in time during the processing of the ore, at a level substantially lower than that representing the total precious metal contained in the ore. In fact, the precious metal concentration of the liquid phase remains throughout the leaching and cementation process at a level equivalent to between 0.01 percent and 70 percent of the total precious metal values contained in the ore. Once cementation has occurred conventional methods can be employed to recover the metal values.

PREFERRED EMBODIMENT OF THE INVENTION

This invention provides for an improved process for the recovery of precious metals from various types of ores, including carbonaceous or refractory ores and mixtures of carbonaceous ores and oxide ores. The fraction of oxide ore in the mixtures of carbonaceous and oxide ores contemplated by the process of this invention may vary. Such mixtures usually contain up to 70 percent of oxide ore. What is characteristic of the types of ore mixtures contemplated is that they are not amenable to standard cyanidation techniques, i.e., less than about 50 percent precious metal extraction is obtainable from them when treated by conventional straight cyanidation methods. The process is not limited to the recovery of gold, but is also applicable to the recovery of silver. For simplicity, however, gold recovery will serve henceforth to illustrate the application of the process.

In accordance with the process, an aqueous slurry of ground, gold-containing ore is contacted with a reducing metal selected from the group consisting of cadmium, copper, iron, lead, molybdenum, tin, zinc and alloys and mixtures comprising at least two of these metals. Copper, zinc and iron are the preferred metals, and mild steel is the preferred alloy. The reducing metals are capable of cementing the gold values onto their surface. The most effective metals provide an ability to recover 75 percent or better of the gold from the ore. Aluminum is not included as a useful reducing metal due to the consistently excessive metal losses experienced with it.

The slurry-metal contact occurs under conditions favoring at least partial instantaneous dissolution of the gold from the ore into the aqueous phase of the slurry, thereby providing for simultaneous leaching and cementation. Partial instantaneous dissolution means that at any point in time during the processing of the ore the concentration of the gold in the liquid phase is more than 0.01 percent of the total gold contained in the ore but less than 70 percent of said total. To promote these conditions an aqueous slurry of the ground ore is prepared containing between 25 and 60 percent solids, and preferably 35 to 50 percent solids, with ore which has been ground to a particle size of less than 10 mesh and preferably less than 48 mesh. The pH of the aqueous phase of the slurry is adjusted by the addition of an alkaline material, including alkali metal hydroxides and carbonates and alkaline earth metal hydroxides and carbonates, in an amount sufficient to provide a pH above 9, and preferably between 9.5 and 12. The preferred alkaline material is sodium carbonate. When sodium carbonate is used the desired pH is achieved by using between 5 to 100 pounds, expressed as $Na_2CO_3$, per ton of ore, and preferably between 10 and 75 pounds. As used herein, alkali metal includes sodium and potassium, and alkaline earth metal includes magnesium and calcium.

The alkaline material used to adjust the pH of the liquid phase can be, for example, an alkali metal carbonate, an alkali metal hydroxide, an alkaline earth metal carbonate or an alkaline earth metal hydroxide. Examples of useful alkali or alkaline earth metal reagents are sodium carbonate (preferred), potassium hydroxide, potassium carbonate, sodium hydroxide, calcium hydroxide, calcium carbonate, magnesium hydroxide and mixtures thereof. Other useful alkali or alkaline earth reagents are the oxides of an alkali metal or an alkaline earth metal, such as sodium oxide, potassium oxide, magnesium oxide, calcium oxide and mixtures thereof.

Promoting partial dissolution of the gold values and thereby providing for simultaneous leaching and cementation is accomplished by the use of the unique combination of complexing agent, alkalinity, temperature and other factors described herein. The preferred complexing agent is sodium cyanide, which can be added to the slurry in an amount equivalent to between 0.05 and 5 grams per liter of the aqueous phase, and preferably between 0.1 and 2 grams per liter of the aqueous phase. The complexing agent can be added to the slurry as a solid or, preferably, as an aqueous solution. For example, a sodium cyanide solution having between 10 and 15 percent of NaCN by weight may be used. The process is not limited to the use of sodium cyanide as the complexing agent, and other complexing agents, such as potassium cyanide, sodium chloride, sodium thiosulfate, thiourea and the like, may be utilized in this capacity. After preparation of the ore slurry the reducing metal is introduced directly into the slurry to initiate gold cementation, and continuous transfer of gold values from the ore to the reducing metal occurs. The process, therefore, does not require the isolation of a gold-bearing liquor since cementation is effected during the course of leaching.

In carrying out the process of simultaneous leaching and cementation agitation should be provided by mechanical means and/or aeration of the slurry. The retention time required for the slurry-metal contact—which varies with the type of ore, the reducing metal and the conditions under which the ore is treated—is in excess of about thirty minutes and preferably ranges between 1 and 48 hours. The required temperature is above 100° F., and preferably between 140° and 200° F. Temperatures higher than 200° F. may be employed so long as adverse effects, such as excessive evaporation, do not result. The process pressure may exceed atmospheric pressure; however, the preferred process pressure is atmospheric.

Cementation is the process of obtaining a metal from solution through chemical displacement by a more active metal. The form in which the cementing or reducing metal can be employed may vary, that is, the metals can have the form of turnings, balls, powders, sheets, coatings, etc. Accordingly, a change in metal form can require specific arrangement conditions for the slurry-metal contact and, therefore, various physical arrangements can be employed to carry out the leaching and cementation process. The slurry, for example, may be pumped through a column packed with metal turnings or, alternatively, metal sheets may be suspended directly in the slurry contained in a tank provided with means for agitation. To effectively carry out the process of simultaneous leaching and cementation the reducing metal used should provide for a ratio of metal surface to ore weight of 0.01 to 1.0 square foot per pound of dry ore being treated, depending on the type of ore, the reducing metal, its physical form and the gold content of the ore being treated, and preferably from 0.1 to 0.8 square foot per pound of dry ore.

In order to enhance the performance of the simultaneous leaching and cementation process an assortment of additives such as salts of lead, copper and other metals, may be optionally introduced into the aqueous phase of the ore slurry to promote and accelerate the cementation of gold onto the metal surface. Also, oxygen or compressed air may be optionally sparged through the slurry prior to and/or during the slurry-metal contact to enhance the effectiveness of the leaching and cementation step.

In one embodiment of this invention a slurry of the gold-containing ore is prepared, followed first by addition of a pH adjustor and, second, by addition of a gold-complexing agent, after which the ore slurry is contacted with a reducing metal under conditions favoring at least partial solubilization of gold to effect simultaneous leaching and cementation. However, the invention is not limited to this order of reagent addition, and blending the ore with an aqueous solution to which the alkaline material and the gold scavenger have already been added is also permissible. Since the reducing metal may have a number of suitable forms, such as turnings, plates, powders, balls and rods, the point at which the contact of the ore slurry with the metal is initiated may vary. For example, if the physical arrangement for the slurry-metal contact employs towers packed with a suitable form of the reducing metal such as balls or turnings, then a fully prepared slurry, that is, one already preheated, with pH adjustments made, and gold-complexing agent added, may flow into and through the towers. If, for instance, the physical arrangement calls for a container, such as a tank, for the slurry-metal contact to take place, the order in which the reagents, including the reducing metal, are added is not critical. Different physical arrangements may require variations in the practice of the process, all of which serve to demonstrate the scope of the invention without limiting it.

After obtaining the cementation product, that is, the cementing or reducing metal with the gold values cemented thereon, a reducing metal-slurry separation step is carried out. This step involves the separation of the gold-containing reducing metal from the slurry and will vary according to the physical arrangement chosen to carry out the process. For example, if the reducing metal employed is in the form of plates suspended or immersed in a vessel containing the slurry, these plates may be withdrawn from the slurry. If the reducing metal employed is in the form of turnings in a packed column, the column may simply be drained of the slurry. Whatever the form of the reducing metal, once it is isolated from the slurry mechanically or manually, it can be washed of any residual slurry by dipping or rinsing with water. The gold-coated cementation metal is then subjected to a precious metal recovery step by conventional methods such as dissolution with a sodium cyanide solution followed by electrolysis.

Since the simultaneous leaching and cementation process does not require the isolation of a gold-bearing leach liquor, it does not use such steps as filtering, washing and deaeration of the slurry to obtain a metal-bearing solution, and does not require complete dissolution of the gold values at any one point in time; instead, the process requires only partial dissolution of the gold values as stated hereinabove.

By way of summary, the simultaneous leaching and cementation process recovers gold and/or silver by making an aqueous slurry of the ground ore, adding a pH regulator such as sodium carbonate to the slurry to adjust the pH of the liquid phase to an alkaline level higher than 9, adding a precious metal-complexing agent such as sodium cyanide, and providing in the slurry a reducing metal capable of cementing the precious metal values onto its surface. Simultaneous leaching and cementation means that both occur at the same time. Conventionally, leaching and cementation are carried out in two sequential operations and require that the ore first be leached, the pregnant liquor be separated by filtration or settling methods and the separated liquor be subjected to cementation. By combining the two operations into one and providing certain prescribed conditions (the method, for example, does not work at ambient temperatures), this invention is able to achieve improved recoveries with fewer unit operations and, in particular, without any oxidative pretreatment of the ore slurry.

Not all metals commonly used in conventional cementation processes can be used in the simultaneous leaching and cementation process, but only those included in the group defined hereinabove make the unitized operation possible. A mixture of these metals may be used under certain circumstances with satisfactory results. Thus, for example, if the reducing metal-slurry contact is carried out in a tower, a mixture of copper and iron balls may be used to pack the tower. Also, the addition of a precious metal-complexing agent to a slurry of the ores covered by the process of this invention does not afford extensive leaching of the precious metal values in the absence of these selected reducing metals. The simultaneous leaching and cementation process may be effected with or without aeration of the slurry.

DETAILED DESCRIPTION OF THE DRAWING

Figure 1:
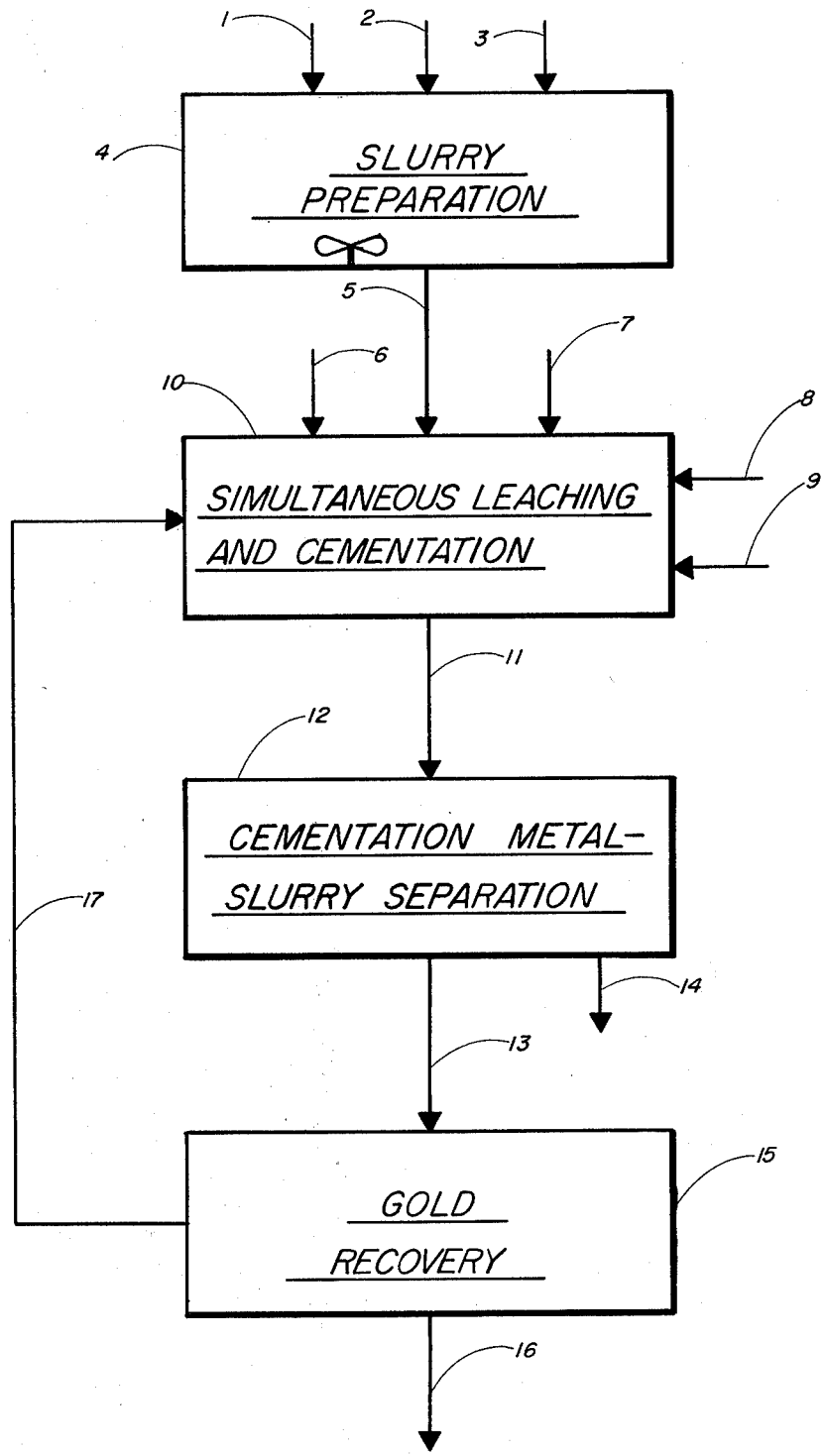

The FIGURE in the drawing is a schematic representation of one embodiment of the invention as applied to gold recovery.

In the FIGURE, ground ore 1, water 2 and pH regulator 3 are mixed 4 to prepare aqueous slurry 5, gold-complexing agent 6, reducing metal 7 and air 8 are simultaneously added to the aqueous slurry and heat 9 is supplied to achieve simultaneous leaching and cementation 10. Treated aqueous slurry 11 is subjected to cementation metal-slurry separation 12 to obtain cementation product 13 and slurry tailings 14. Cementation product 13 is subjected to gold recovery 15 to recover gold product 16, with the separated reducing metal 17 being recycled to simultaneous leaching and cementation step 10.

The following examples illustrate permissible variations of this invention, the wide range of its application and the improvements in recovery it affords, without intending to limit its scope. Even though the examples demonstrate the simultaneous leaching and cementation process in a batchwise fashion, it will be understood that the process may also be carried out as a continuous operation. As used herein, all parts, ratios, proportions and percentages are on a weight basis unless otherwise stated herein or otherwise obvious herefrom to one ordinarily skilled in the art.

EXAMPLE 1

A 270 gram sample of a gold-containing carbonaceous ore from the area known as Marlboro Canyon in Elko County, Nevada, was used. This ore contained 0.229 ounce of gold per ton of ore, 0.68 percent of organic carbon, 6.5 percent of total carbon and 1.54 percent of sulfur. The ore sample was prepared by crushing and grinding it to a particle size of minus 100 mesh. The ground ore sample was slurried with water to approximately 35 percent solids and the pH of the liquor was adjusted to approximately 11 by the addition of sodium carbonate in quantities sufficient to provide 75 lbs. of $Na_2CO_3$ per ton of ore. Cupric chloride was also admixed into the slurry in an amount equivalent to 50 milligrams of $CuCl_2$ per liter of aqueous phase. Sodium cyanide was used as the gold-complexing agent and was added in an amount equivalent to 1.0 gram of NaCN per liter of aqueous phase. The slurry was stirred, heated to 180° F., and aerated with 200 cc/min of air for the duration of the test, during which time the slurry was continuously recirculated through a small column loosely packed with light copper turnings. The ratio of metal surface (copper turnings) to ore in the column was approximately 0.3 square foot per pound of ore being treated. After a period of 11 hours, the phases were separated and analyzed for gold content. The aqueous phase of the slurry was found to contain 0.015 milligram of gold per liter, and the solid phase analysis was 0.012 ounce per ton; these values represent a gold recovery of 95 percent. (Recovery is calculated from data collected of gold concentrations present in the liquid and solid phases at the time the recovery is reported.) The gold concentrations of both phases of the slurry were measured periodically throughout the duration of the test. The maximum measured gold concentration of the liquid phase of this sample occurred 2 hours after initiating the simultaneous leaching and cementation, and it was 0.26 milligram of gold per liter, which represents 6 percent of the total amount of gold in the ore.

EXAMPLE 2

A 270 gram sample of a gold-containing carbonaceous ore from the area of Generator Hill in Elko County, Nevada and designated as Generator Hill ore, was used. This ore contained 0.312 ounce of gold per ton of ore, 0.58 percent of organic carbon, 5.3 percent of total carbon and 0.80 percent of sulfur. The ore sample was prepared and treated by simultaneous leaching and cementation in the same manner as the ore sample of Example 1. The final liquor and solids were found to contain 0.013 milligram of gold per liter and 0.031 ounce of gold per ton, respectively; these values represent a gold recovery of 90 percent. The gold concentrations of both phases of the slurry were measured periodically during the test. The maximum measured gold concentration of the liquid phase of this sample occurred approximately 2 hours after initiating the simultaneous leaching and cementation, and it was 0.491 milligram per liter, which represents 8.5 percent of the total gold in the ore.

EXAMPLE 3

In this test a fresh 270 gram sample of gold-containing carbonaceous Generator Hill ore of the type characterized in Example 2 was subjected to the process of simultaneous leaching and cementation in the absence of any aeration. The ground ore was slurried with water to approximately 35 percent solids and sodium carbonate was admixed in an amount equivalent to 75 pounds per ton of ore, which amount provided a pH value of 11 for the liquid phase. The slurry was stirred and heated until the temperature reached 180° F., at which point sodium cyanide was added in an amount equivalent to 1.0 gram per liter of aqueous phase, and cupric chloride was added in an amount equivalent to 50 milligrams per liter of aqueous phase. The slurry was stirred and heated to 180° F. for the duration of the test, during which time the slurry was recirculated through a column loosely packed with copper turnings. The ratio of copper metal surface area to ore in the column was approximately 0.35 square foot per pound of ore. After 6 hours the phases were separated and analyzed for gold content. The aqueous phase contained 0.024 milligram of gold per liter, and the ore tailings contained 0.041 ounce of gold per ton, which values equate to a recovery of 86 percent. The maximum measured gold concentration of the liquid phase was 0.221 milligram per liter, which value was observed 2 hours after initiating the simultaneous leaching and cementation, and represents 4 percent of the total amount of gold in the ore sample.

Examples 1 to 3 demonstrate the application and success of the process of simultaneous leaching and cementation to gold-containing carbonaceous ores, which are ordinarily refractory to any process scheme without an aggressive oxidation pretreatment.

EXAMPLE 4

The process of simultaneous leaching and cementation, using sodium chloride as the gold-complexing agent and iron as the cementation metal, was applied to a 375 gram sample of a gold-containing carbonaceous ore from the area of Marlboro Canyon in Elko County, Nevada. This ore contained 0.292 ounce of gold per ton of ore, 0.43 percent of organic carbon and 0.72 percent of sulfur. The aqueous slurry was prepared by crushing and grinding the ore with water to approximately 45 percent solids and adding sodium carbonate to the aqueous slurry in an amount similar to that used in Example 1. The aqueous slurry was heated to 180° F., after which sodium chloride, in a quantity equivalent to 1.2 grams per liter of aqueous phase, was added to the slurry. The mixture was heated, agitated and aerated with 200 cc/min of air for 2 hours. A sample of the slurry was then taken, and the phases of the sample were separated and analyzed for gold content. The gold concentration in the liquor was found to be 0.351 milligram per liter, which is approximately 4 percent of the total gold contained in the ore. The solids analysis was 0.276 ounce of gold per ton. The process of simultaneous leaching and cementation was then inititated by placing directly into the slurry a reducing metal, in this case pieces of iron grating, in an amount equivalent to 0.5 square foot per pound of ore being treated. Cupric chloride was also admixed into the slurry in an amount equivalent to 50 milligrams of $CuCl_2$ per liter of liquor. After 26 hours more of agitating and heating, the phases were separated and analyzed for gold content. The bleed was found to contain 0.016 milligram of gold per liter, and the solids analysis was 0.046 ounce per ton. A gold recovery of 84 percent was obtained.

EXAMPLES 5 TO 8

TESTS CONDITIONS

| Example No. | 5 | 6 | 7 | 8 |
|---|---|---|---|---|
| Amount of sample (grams) | 740 | 370 | 270 | 270 |
| Reducing metal | scrap iron suspended loosely in slurry | zinc shot suspended loosely in slurry | copper turnings in a column | copper sheet suspended in slurry |
| Metal surface to ore ratio (ft²/lb of ore) | 0.6 | 0.6 | 0.32 | 0.84 |
| Solids concentration (%) | 50 | 50 | 35 | 35 |
| NaCN concentration (g/l liquor) | 0.5 | 0.5 | 1 | 1 |
| Temperature (°F.) | 120°-1st half hr. only, then 180° | 120°-1st half hr. only, then 180° | 180° | 180° |
| Aeration (cc of air/min) | 200 (1st half hr only) | 200 (1st half hr only) | 200 (6 hrs) | 200 (6 hrs) |
| Retention time (hrs) | 22 | 24 | 6 | 6 |

TESTS DESCRIPTION

Examples 5 and 6 were applied to a gold-containing carbonaceous ore characterized by the gold, carbon and sulfur contents set out in Example 1. Example 7 and 8 were conducted on Generator Hill ore characterized by the gold, carbon and sulfur contents set out in Example 2. The ores were treated according to the above stated experimental conditions. In all of the experiments, the amount of pH regulator employed was 75 lbs. of $Na_2CO_3$ per ton of dry ore, which provided a pH value for each liquor of about 11, and the amount of cupric chloride added was 50 milligrams of $CuCl_2$ per liter of liquor.

In Examples 5 and 6, the ore, water, sodium carbonate and sodium cyanide were combined, heated to 120° F., and then stirred and aerated for 30 minutes. Aeration was halted, cupric chloride was added, and the slurry was heated to 180° F. The simultaneous leaching and cementation process was initiated by introducing the reducing metal into the slurry—such slurry was then stirred and heated for the duration of the tests. In Examples 7 and 8, the ore, water and sodium carbonate were combined and heated to 180° F. Subsequently the other reagents were added to the slurry. Aeration and slurry-metal contact were begun simultaneously and aeration continued throughout the tests. The following results were obtained for these samples:

| Results Example No. | 5 | 6 | 7 | 8 |
|---|---|---|---|---|
| Residual gold in liquor (mg/l) | 0.007 | 0.015 | 0.016 | 0.019 |
| Residual gold in solids (oz/ton) | 0.013 | 0.012 | 0.029 | 0.038 |
| Max. measured gold concentration in liquor (time it occurred) [percent of total gold (hrs)] | 0.6, (16) | 1.5, (6) | 2, (2) | 10, (5) |
| Max. measured gold concentration in liquor (mg/l) | 0.046 | 0.098 | 0.115 | 0.588 |
| Gold recovery (percent) | 95 | 95 | 91 | 88 |

The above examples illustrate the flexibility in physical arrangements, as well as permissible variations of the identity and form of the reducing metals employed in the practice of this invention.

EXAMPLE 9

The process of simultaneous leaching and cementation, using sodium cyanide as the gold-complexing agent and copper as the cementation metal, was applied to a 270 gram sample of a silver-bearing carbonaceous ore from the area of Creede, Colorado. The ore had 4.16 ounces of silver per ton of ore, and was comminuted to a particle size of minus 100 mesh and slurried with water to 35 percent solids. Sodium carbonate was added in an amount equivalent to 75 lbs. of $Na_2CO_3$ per ton of ore, thereby establishing a pH value for the liquor of about 11, and the slurry was heated to 180° F. The simultaneous leaching and cementation process was initiated by the addition to the slurry of sodium cyanide, in an amount equivalent to 1.0 gram of NaCN per liter of aqueous phase, and of cupric chloride, in an amount equivalent to 50 milligrams of $CuCl_2$ per liter of aqueous phase, and by the immersion of copper into the slurry. The copper was in the form of sheet metal and provided a ratio of metal surface to ore of 0.8 square foot per pound. After agitating with aeration at 200 cc of air/min for approximately 6 hours phase separation was carried out. The bleed liquor was analyzed and found to contain 0.03 milligram of silver per liter; the solids analysis was 1.37 ounces of silver per ton; and the silver recovery was 67 percent. The maximum measured concentration of silver in the liquid phase during the test was 1.04 milligrams per liter, which represents 1 percent of the total silver contained in the ore. The maximum measured silver concentration in the liquid phase occurred 0.5 hours after initiating simultaneous leaching and cementation.

EXAMPLE 10

A 454 gram sample of a gold-containing Generator Hill carbonaceous ore of the type characterized in Example 2 was tested using sodium cyanide as the gold-complexing agent and aluminum as the cementation metal. The ore sample was tested in the following manner. The ore was combined with water to form a slurry having a solids concentration of 45 percent. To provide for a liquid phase pH value of about 11 sodium carbonate was added in an amount equivalent to 75 pounds per ton of ore; the slurry was then heated to 180° F. To initiate simultaneous leaching and cementing sodium cyanide and cupric chloride were added in amounts equivalent to 1.0 gram per liter and 50 milligrams per liter of aqueous phase, respectively, followed by introduction of the reducing aluminum metal into the slurry. The aluminum was in the form of plates and provided a ratio of metal surface to ore of 0.2 square foot per pound. The slurry was stirred and aerated at a rate of 200 cc of air/min for 24 hours, with subsequent phase separation. Analysis of the aqueous phase found it to contain 0.10 milligram of gold per liter; the solids analysis was 0.064 ounce of gold per ton; consequently, gold recovery was 78 percent. The maximum measured gold concentration present in the liquor during the test was 0.44 milligram of gold per liter, which represents 5 percent of the total gold contained in the ore. The maximum measured gold concentration in the liquid phase occurred 6 hours after initiating the test. However, heavy aluminum metal losses were incurred, which were equivalent to a corrosion rate of over one-inch of metal thickness per year.

EXAMPLE 11

A 625 gram sample of Generator Hill carbonaceous ore was tested using sodium cyanide as the gold-complexing agent in the absence of a reducing metal as called for in the invention. This ore was characterized by a gold content of 0.36 ounce per ton, an organic carbon content of 0.58 percent and a sulfur content of 0.80 percent. The sample was prepared by crushing and grinding the ore to a particle size of minus 100 mesh and slurrying the ground ore with water to approximately 45 percent solids. Sodium carbonate and cupric chloride were added to the slurry in quantities equivalent to 75 pounds per ton of ore and 50 milligrams per liter of aqueous phase, respectively. The pulp was then heated to 180° F. Sodium cyanide was then added in an amount equivalent to 1.0 gram per liter of liquor, and the slurry was agitated with aeration for 12 hours, after which the phases were separated and analyzed for gold content. The bleed was found to contain 0.04 milligram of gold per liter, and the solids analysis yielded 0.36 ounce of gold per ton. The gold recovery was nil. Periodic sampling throughout the test showed that leaching had occurred. The maximum measured amount of gold dissolved in the liquor was 3.3 milligrams of gold per liter, which represents 38 percent of the total gold in the ore. The maximum measured gold concentration in the liquor occurred six hours after initiating the test. However, by the time the experiment was halted pregrobbing had occurred and virtually all the gold in the liquor had returned to the ore.

The process of this invention provides for transfer of the gold values from the ore to the reducing metal. If the reducing metal is not employed, as shown in this example, leaching suffers and recoveries are poor. Filtering the slurry at the point where the gold dissolution was maximum and then processing the solution obtained to recover the gold in the most effective manner would result in a recovery of 38 percent at best.

The following examples illustrate the importance of the operating temperature of this invention.

EXAMPLE 12

An 880 gram sample of gold-containing, Generator Hill carbonaceous ore of the type characterized in Example 2 was tested in the following manner. The ore was comminuted to a particle size of minus 100 mesh and slurried with water to approximately 45 percent solids. Sodium carbonate and cupric chloride were added in amounts equivalent to 75 pounds per ton of ore, to establish a pH value for the liquor of about 11, and 50 milligrams per liter of aqueous phase, respectively. Iron, in sheet form, providing for a metal surface to ore ratio of 0.3 square foot per pound, was introduced into the slurry. This was followed by the addition to the slurry of sodium cyanide in an amount equivalent to 1.0 gram of NaCN per liter of liquor. The slurry was agitated via aeration for 16 hours at an ambient temperature of 75° F., after which the phases were separated and analyzed for gold content. The liquid phase was found to contain 0.19 milligram of gold per liter; the solids analysis was 0.301 ounce of gold per ton. Thus over 95 percent of the gold remained in the ore. (The maximum measured concentration of gold present in the liquor was 0.95 milligrams of gold per liter, which value is 11 percent of the total gold in the ore. The maximum measured gold concentration in the liquor occurred 8 hours into the test.)

EXAMPLE 13

Example 12 was repeated on another 880 gram sample of the same Generator Hill ore, but in this test the reducing metal employed was copper in sheet form. The copper sheet provided a ratio of metal surface to ore of 0.3 square foot per pound. After a retention time of 16 hours the phases were separated and analyzed for gold content. The liquid phase was found to contain 0.15 milligram of gold per liter, and the solids analysis yielded 0.301 ounce of gold per ton. Thus over 95 percent of the gold remained in the ore. (The maximum measured concentration of gold in the liquor was 2.35 milligrams of gold per liter, which value represents 27 percent of the total gold present in the ore. The maximum measured concentration of gold occurred 12 hours into the test.)

The gold content of both phases of the slurries used in Examples 4 and 8 was measured as a function of the time used in carrying out the simultaneous leaching and cementation process, and the results are tabulated below. They illustrate the continual and simultaneous depletion of the gold content in both the solid and liquid phases.

Gold Contents of Solid and Liquid Phases Measured Over the Course of Simultaneous Leaching and Cementation Tests

| | Example 4 | | | Example 8 | |
| --- | --- | --- | --- | --- | --- |
| Time (hrs) | Gold in Solids (oz/ton) | Gold in Liquor (mg/l) | Time (hrs) | Gold in Solids (oz/ton) | Gold in Liquor (mg/l) |
| 0 | 0.292 | — | 0 | 0.312 | — |
| 2 | 0.276 | 0.351 | 0.5 | 0.101 | 0.588 |
| 3 | 0.162 | 0.074 | 1 | 0.065 | 0.372 |
| 6 | 0.123 | 0.038 | 2 | 0.047 | 0.056 |
| 11 | 0.087 | 0.028 | 4 | 0.047 | 0.022 |
| 18 | 0.075 | 0.024 | 6 | 0.038 | 0.019 |
| 24 | 0.060 | 0.020 | | | |
| 30 | 0.046 | 0.016 | | | |

What is claimed is:

1. Process for the recovery of a precious metal or metals from an ore selected from the group consisting of a carbonaceous ore and a mixture of a carbonaceous ore and an oxide ore, comprising:
   (a) preparing an aqueous slurry of said ore in ground form;
   (b) simultaneously leaching and cementing said precious metal or metals from said aqueous slurry of ore in ground form at an elevated temperature by:
      (i) adding sufficient alkaline material to said aqueous slurry to maintain the liquid phase of said aqueous slurry at a pH higher than 9;

(ii) adding an effective amount of a precious metal-complexing agent to said aqueous slurry;

(iii) contacting said slurry with an effective amount of a reducing metal selected from the group consisting of cadmium, copper, iron, lead, molybdenum, tin, an alloy of at least two of such metals and a mixture of at least two of such metals, whereby simultaneous leaching and cementation of said precious metal or metals occur; and (c) separating said reducing metal and cemented precious metal or metals from said aqueous slurry.

2. Process as claimed in claim 1 wherein said precious metal is gold.

3. Process as claimed in claim 1 wherein said precious metal is silver.

4. Process as claimed in claim 1 wherein said precious metal-complexing agent is selected from the group consisting of sodium cyanide, potassium cyanide, sodium chloride, sodium thiosulfate and thiourea.

5. Process as claimed in claim 1 wherein said precious metal-complexing agent is sodium cyanide.

6. Process as claimed in claim 5 wherein said sodium cyanide is used in an amount equivalent to between 0.05 and 5.0 grams per liter of the aqueous phase of said slurry.

7. Process as claimed in claim 1 wherein said precious metal-complexing agent is used in the form of an aqueous solution.

8. Process as claimed in claim 1 wherein said reducing metal is copper.

9. Process as claimed in claim 1 wherein said reducing metal is iron.

10. Process as claimed in claim 1 wherein the reducing metal is used in an amount which provides a ratio of metal surface to ore of 0.01 to 1.0 square foot per pound of dry ore.

11. Process as claimed in claim 1 wherein the reducing metal is used in an amount which provides a ratio of metal surface to ore of 0.1 to 0.8 square foot per pound of dry ore.

12. Process as claimed in claim 1 wherein said slurry is maintained at a pH between 9.5 and 12.

13. Process as claimed in claim 1 wherein said alkaline material is a hydroxide, carbonate or oxide of an alkali metal or an alkaline earth metal.

14. Process as claimed in claim 1 wherein said alkaline material is sodium carbonate.

15. Process as claimed in claim 14 wherein said sodium carbonate is used in an amount equivalent to between 5 and 100 pounds per ton of ore.

16. Process as claimed in claim 1 wherein said alkaline material is sodium hydroxide.

17. Process as claimed in claim 1 wherein the simultaneous leaching and cementation step is conducted at a temperature of at least 100° F.

18. Process as claimed in claim 1 wherein the simultaneous leaching and cementation step is conducted at a temperature between 140° and 200° F.

19. Process as claimed in claim 1 wherein the retention time for the contact between the slurry and the reducing metal is at least 30 minutes.

20. Process as claimed in claim 1 wherein the retention time for the contact between the slurry and the reducing metal is between 1 and 48 hours.

21. Process as claimed in claim 1 wherein said ore is a carbonaceous ore.

22. Process as claimed in claim 1 wherein said ore is a mixture of a carbonaceous ore and an oxide ore.

23. Process as claimed in claim 1 wherein said aqueous slurry contains between 25 and 60 percent by weight of solids.

24. Process as claimed in claim 1 wherein said aqueous slurry contains between 35 and 50 percent by weight of solids.

25. Process as claimed in claim 1 wherein the ore is in a particulate form having a particle size of less than 10 mesh.

26. Process as claimed in claim 1 wherein said slurry is aerated during said simultaneous leaching and cementation step.

27. Process as claimed in claim 1 wherein a copper or lead salt is added to the aqueous phase of said slurry.

28. Process as claimed in claim 1 wherein said precious metal is recovered from the cementation product, containing said precious metal, resulting from said simultaneous leaching and cementation step.

* * * * *